United States Patent [19]

Walker et al.

[11] Patent Number: 5,570,423
[45] Date of Patent: Oct. 29, 1996

[54] METHOD OF PROVIDING ADAPTIVE ECHO CANCELLATION

[75] Inventors: Michael Walker, Baltmannsweiler; Hans-Jürgen Matt, Remseck, both of Germany

[73] Assignee: Alcatel N.V., Rijswijk, Netherlands

[21] Appl. No.: 519,303

[22] Filed: Aug. 25, 1995

[30] Foreign Application Priority Data

Aug. 25, 1994 [DE] Germany ............................ 44 30 189.8

[51] Int. Cl.⁶ .................... H04B 3/20; H04M 9/08
[52] U.S. Cl. .................... 379/410; 379/411; 379/388; 370/32.1
[58] Field of Search ................... 379/406, 410, 379/411, 388, 389, 390, 392; 370/32.1

[56] References Cited

U.S. PATENT DOCUMENTS

| | | | |
|---|---|---|---|
| 3,836,734 | 9/1974 | Campanella et al. | 379/411 |
| 4,349,889 | 9/1982 | Van Den Elzen et al. | 370/32.1 X |
| 4,388,724 | 6/1983 | Gockler | 375/14 |
| 4,852,036 | 7/1989 | Kobayashi | 379/410 X |
| 4,912,758 | 3/1990 | Arbel | 379/388 |
| 4,965,822 | 10/1990 | Williams | 379/390 |
| 4,998,241 | 3/1991 | Brox et al. | 370/32.1 |
| 5,007,044 | 4/1991 | Miyoshi et al. | 379/411 X |
| 5,192,918 | 3/1993 | Sugiyama | 328/165 |
| 5,245,561 | 9/1993 | Sugiyama | 364/724.19 |
| 5,272,695 | 12/1993 | Makino et al. | 379/410 X |
| 5,307,405 | 4/1994 | Sih | 379/411 X |
| 5,323,459 | 6/1994 | Hirano | 379/388 X |
| 5,386,472 | 1/1995 | Pfaff et al. | 381/71 |
| 5,396,299 | 3/1995 | Greenberg | 348/614 |
| 5,408,530 | 4/1995 | Makino et al. | 379/392 |
| 5,428,681 | 6/1995 | Andre | 379/410 X |
| 5,455,819 | 10/1995 | Sugiyama | 370/32.1 X |
| 5,467,394 | 11/1995 | Walker et al. | 379/392 |

FOREIGN PATENT DOCUMENTS

| | | |
|---|---|---|
| 391784 | 11/1990 | Austria . |
| 0310055 | 1/1994 | European Pat. Off. . |
| 0597201 | 5/1994 | European Pat. Off. . |

OTHER PUBLICATIONS

Yamamoto et al. "An Adaptive Echo Canceller with Variable Step Gain Method", The Transactions of the IECE of Japan, vol. E 65, No. 1, Jan. 1982.

"Kombination von Geräuschreduktion und Echokompensation beim Freisprechen", T. Huhn et al., *Nachrichtentech Elektron.*, Berlin 43 (1993) 6, pp. 274–280.

"The Hands–Free Telephone Problem—An Annotated Bibliography", E. Hänsler, *Signal Processing*, vol. 27, No. 3, Jun. 1992, pp. 259–271 (presented as pp. 1–17).

"Handsfree Speaking—A Step Towards Natural Communication", M. Walker, *Electrical Communication*, 2nd Quarter 1993, pp. 181–187.

*Primary Examiner*—Krista M. Zele
*Assistant Examiner*—Devendra Kumar
*Attorney, Agent, or Firm*—Ware, Fressola, Van Der Sluys & Adolphson

[57] ABSTRACT

A method of adaptive echo cancellation finds application for example in the hands-free facilities of telecommunications terminals, to compensate for disturbing echoes from the acoustic feedback between loudspeaker (1) and microphone (2). It is known to simulate these echoes (h(k)) with digital filters, and to subtract them from the echo-affected microphone signal (z(k)). The realization usually requires a signal processor with a high operating speed, a floating point logic and a large memory space. The task is to present a cost-effective method, which can be used under different acoustic conditions. The invention fulfills this task by using a known FIR filter (5), whose filter coefficients ($c_1$ to $c_N$) are determined according to the NLMS algorithm. The step width ($\alpha$), which determines the changing speed of the filter coefficients ($c_1$ to $c_N$), can be made a function of one or more of various factors, including the current loudspeaker-microphone coupling (dlm), a quality criterion (Q) of the excitation, the existence of local speech signals (lokspk), the existence of briefly fluctuating local noises (lnoise), and the efficiency of the echo canceller. A special scaling of the coefficient values in conjunction with the adaptive step width control, advantageously permits the use of short FIR filters and cost-effective fixed-point computers.

9 Claims, 9 Drawing Sheets

METHOD OF PROVIDING ADAPTIVE ECHO CANCELLATION

TECHNICAL FIELD

The invention concerns a method of providing echo cancellation in a transmission system in which unwanted coupling takes place between a signal in the transmitting direction and a signal in the receiving direction.

BACKGROUND OF THE INVENTION

For example, such a method finds technical application in hands-free speaking systems of telecommunications terminals, in which the acoustic coupling between loudspeaker and microphone leads to a part of the incoming signal feeding back through the air path and possibly through a cabinet into the microphone, and thereby to the speaker on the other side of the transmission system. This part is perceived as a disturbing echo by the speaker. The magnitude of the unwanted coupling between loudspeaker and microphone is determined by the type of sound transducers, their distance from each other, their directional effect and sensitivity, and by the ambient conditions under which the sound transducers operate.

It is known to simulate the echo with digital filters, and to subtract it from the echo-affected microphone signal, see H änsler, E.: The Hands-Free Telephone Problem—An Annotated Bibliography. Signal Processing, Volume 27, No. 3, June 1992, pages 259–271. Different methods can be used to determine the filter coefficients of the digital filter, for example a nonlinear canonical algorithm provided with a sign place, see EP 0,310,055 B1, or the Normalized Least Mean Square Algorithm, NLMS-algorithm for short, see T. Huhn, H. J. Jentschel: Combination of Noise Reduction and Echo Cancellation During Hands-free Operation; Electronic Communications Technology, Berlin 43 (1993), pages 274–280.

Several thousand filter coefficients may be required to obtain a useable approximation to the time function of the echoes. A floating point signal processor with a high operating speed and a large memory are required for the practical realization, so that these possibilities can only be attained at high cost. Because of their high cost, the solutions known so far are not suitable, particularly to fulfill the commercial requirements of qualitatively satisfying hands-free speaking systems, for example narrow band telephones, narrow and broad-band video telephones, in video conference studios, public address systems and listening devices.

The difficulty of balancing the filter coefficients lies in precisely measuring the current pulse response on the basis of the acoustic feedback from the loudspeaker via the air path, and partly through solid bodies, for example a cabinet, to the microphone, even in the presence of disturbing influences. Thus when using an echo canceller, the requirement exists to simultaneously and very reliably differentiate:

a) between echoes and local noise, particularly duplex communication, the so-called double-talk situation, b) between echoes from far reflectors and echoes from near reflectors, and c) between the kinds of incoming signals that permit taking sufficiently precise measurements, for example sufficiently strong broad-band signals, such as for example noises, as they ideally occur with a pulsed impact, and incoming signals that are not suitable for measurements, such as for example weak signals or a continuous sinusoidal signal.

To partially fulfill these requirements it was already proposed to calculate the filter coefficients of a Finite Impulse Response filter, FIR for short, in accordance with the known NLMS algorithm, and when calculating a new filter coefficient, to make the responsible step width $\alpha$ switchable as a function of the magnitude of the potential echo signal, see U.S. patent application Ser. No. 08/197,054, filed Feb. 16, 1994 (U.S. Pat. No. 5,467,394), claiming priority from German Patent Application P 43 05 256.8, filed Feb. 20, 1993. To preclude improper adjustments during duplex communication, the step width $\alpha$ is set to zero in this case, so that a change in the filter coefficients is avoided. However, the filter coefficients are also calculated when the local speaker is silent, and this also means that the filter coefficients are calculated anew, even in the presence of very weak input signals, for example noise, thereby resulting in an improper adjustment of the echo canceller. It was also proposed in the last-mentioned application to improve the echo suppression by determining a loudspeaker-microphone coupling factor, and to vary the loudness of the loudspeaker or the sensitivity of the microphone as a function thereof. The loudspeaker-microphone coupling factor is determined by the correlation of the microphone signal with the loudspeaker signal. However, such a correlation analysis has the disadvantage that erroneous decisions of the correlator cannot be excluded because of the similarity of the speech signals. In addition, the calculation effort is also very extensive, so that the correlation analysis alone requires about 30% of the entire program cost.

DISCLOSURE OF INVENTION

There is now the task of presenting a method to provide adaptive echo cancellation, which can be universally used under different ambient conditions, and which can be cost-effectively realized as basic consumer goods with the help of an integrated circuit in hands-free speaking systems of different sizes. In this instance an FIR filter is used in the known manner, whose filter coefficients are determined according to the NLMS algorithm, for example.

According to the present invention, a method of providing adaptive echo cancellation in a transmission system comprising an echo canceller with a finite impulse response filter (5), "FIR filter" for short, with which the echoes to be expected are simulated and whose output signal is subtracted from the signal affected by echo, the filter coefficients ($c_1 \ldots c_N$) of the FIR filter (5) being determined by a normalized least mean square algorithm, "NLMS algorithm" for short, is characterized in that a step width ($\alpha$) introduced in the NLMS algorithm is controlled in dependence upon the ambient conditions of a signal source and a signal sink at the near end of the transmission system, upon disturbance variables superimposed on the useful signals, and upon the efficiency of the echo canceller, that from the value of the greatest coefficient ($c_{max}$) of the FIR filter (5), a normalization quantity is determined for the FIR filter and, thus, for all filter coefficients ($c_1 \ldots c_N$) of the FIR filter (5) such that the values of the filter coefficients ($c_1 \ldots c_N$) are automatically dynamically scaled and that the range of values lies within defined limits, and that from the time interval between the greatest filter coefficient ($c_{max}$) of the FIR filter (5) and the beginning of the excitation of the signal in the transmit direction, the shortest signal propagation time ($t_{ak}$) from the signal source (1) to the signal sink (2) is determined, the effective time range of the echo canceller is determined therefrom, and this information is used to estimate the residual coupling.

With this method, the change of the filter coefficients is controlled as a function of the respective current coupling factor between loudspeaker and microphone. However, only suitable incoming signals are evaluated when the coupling factor is determined, and this means that weak incoming signals are excluded from the evaluation, as well as local signals which occur during duplex communication. Under these restrictions, the coupling factor is determined by the relationship between the electrical signal at the microphone and the electrical signal at the loudspeaker. In this case, the electrical signal at the loudspeaker is delayed according to the acoustic signal propagation time between the loudspeaker and the microphone, thus forming the relationship between the timely intercorresponding signals.

The delay time to be established is determined from the time position of the largest filter coefficient with respect to the start of the response pulse of the FIR filter.

The value of the largest filter coefficient serves as the output quantity for normalizing the other filter coefficients, thus enabling a precise representation of the filter coefficients with a range of values of about 16 bits per scanning value, as specified by a fixed-point computer.

The incoming signals are supplied to the FIR filter of the echo canceller through a high-pass filter with a low cut-off frequency.

The average value of the difference between the magnitude of the direct microphone signal and the cancelled microphone signal is constantly tested. If the average value becomes negative, it shows an improper adjustment, a so-called overcompensation by the echo canceller.

With respect to the known solutions, the simulation of the echo signal is achieved with a small number of filter coefficients, so that the FIR filter can be cost-effectively realized.

With the method of the invention, an echo canceller that very quickly and very accurately adapts to different conditions, and whose stability is maintained during reception of weak signals and local noise signals and during duplex operation, can be realized at little cost. Such an echo canceller is used in hands-free speaking systems which make possible natural conversation between two or more callers.

The method is applicable in general, even for non-acoustic echo cancellation.

These and other objects, features and advantages of the present invention will become more apparent in light of the detailed description of a best mode embodiment thereof, as illustrated in the accompanying drawing.

BEST MODE FOR CARRYING OUT THE INVENTION

Figures 1, 8:
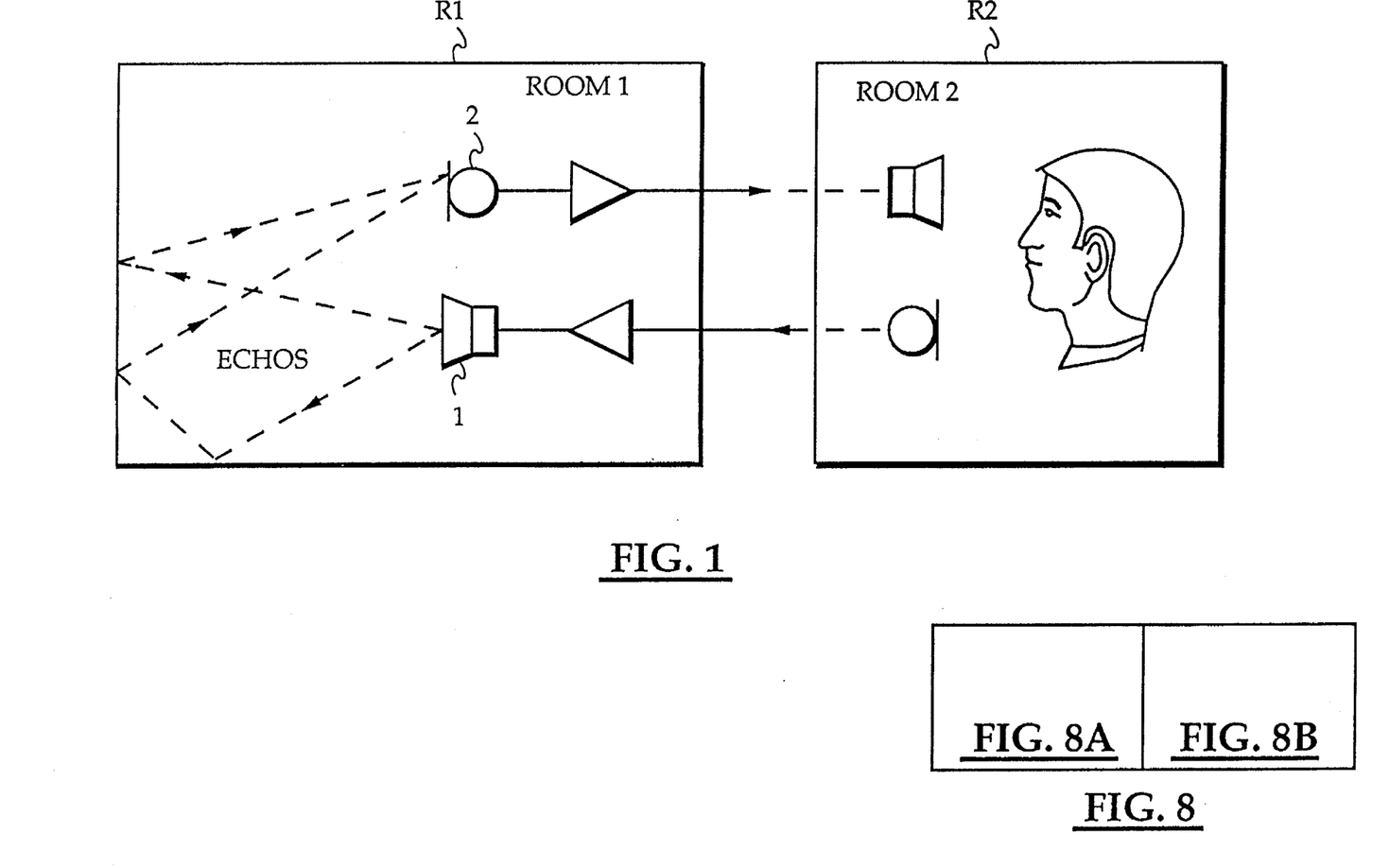
FIG. 1 is an illustration of the local situation during hands-free operation.
FIG. 8 shows how FIGS. 8A and 8B fit together to illustrate a block circuit diagram of a hands-free speaking system.
Figure 2:
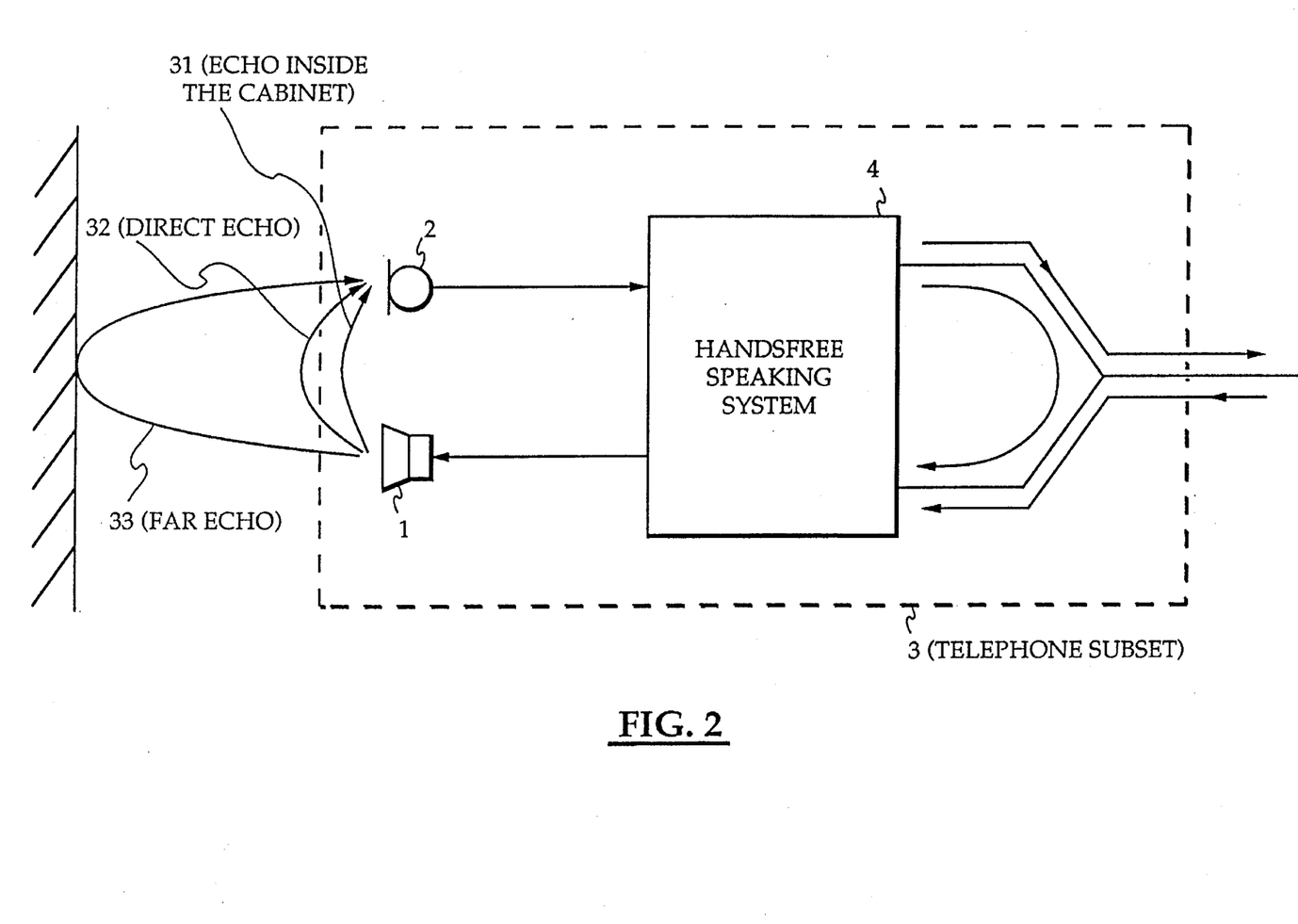
FIG. 2 is a telephone terminal with illustration of the echo formation possibilities.
Figure 3:
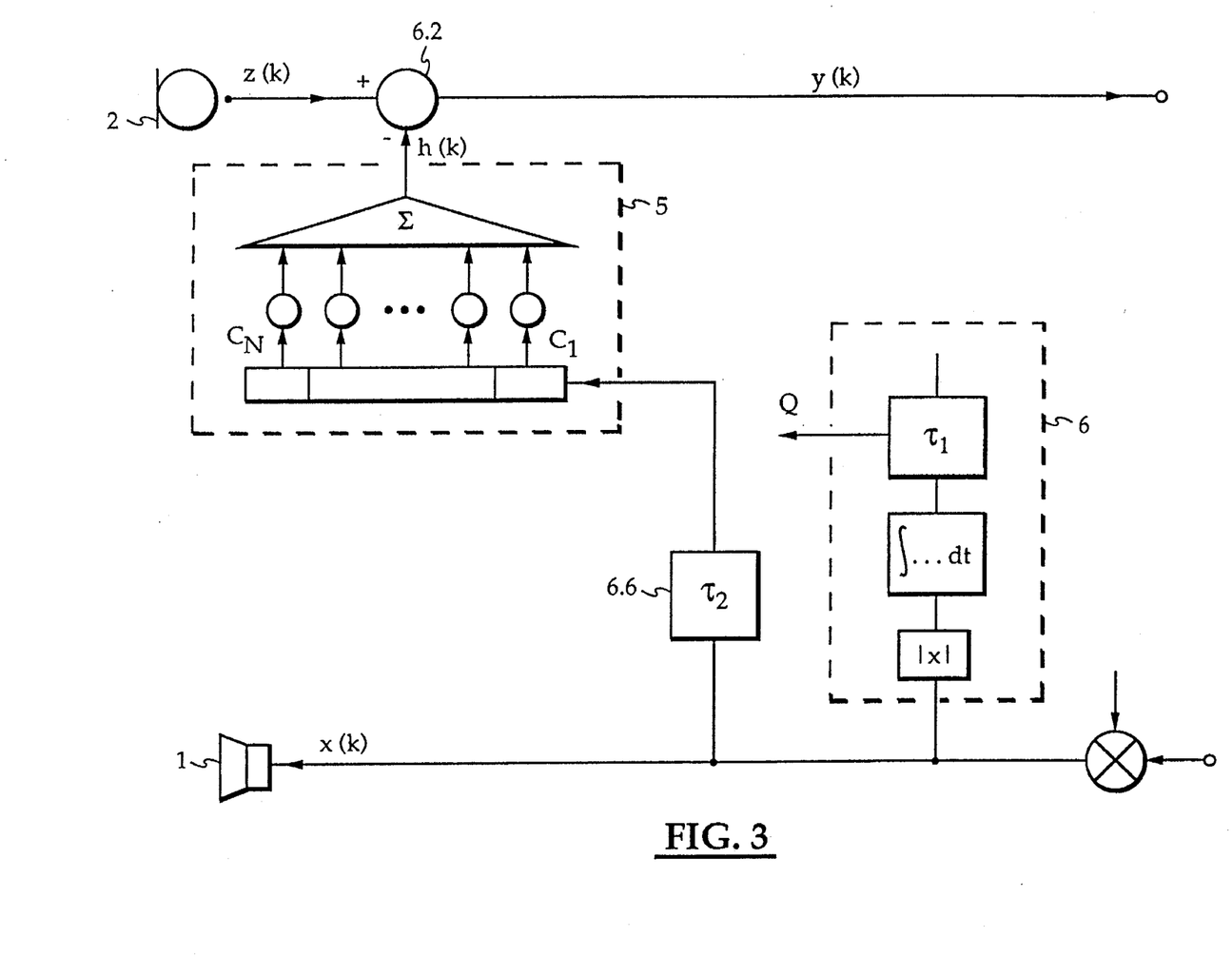
FIG. 3 is a circuit arrangement of an FIR filter and a circuit arrangement for determining quality.

FIG. 1 depicts a speaker in room R2, whose speech is transmitted to room R1. A portion of the acoustic signals emitted by a loudspeaker in room R1 reach a microphone 2, and then reach the speaker in room 2 as acoustic echoes. FIG. 2 illustrates a telephone terminal 3 with loudspeaker 1, microphone 2 and a hands-free speaking system 4, which contains an echo canceller. The microphone 2 is generally surrounded by a spherical space with a predetermined radius, from which echoes can be received. FIG. 2 illustrates different echo producing possibilities. Coupling takes place in a cabinet of telephone terminal 3 between loudspeaker 1 and microphone 2, so that echoes 31 are created inside the cabinet. In addition, direct echoes 32 take place through the air path and finally indirect, farther removed echoes 33 are reflected by the room confines or by objects or persons inside the room. When this acoustic situation is evaluated, noise signals and possibly duplex communication from the room R1 in FIG. 1 must be taken into consideration. It is basically known to eliminate echoes with an echo canceller. FIG. 3 depicts a Finite Impulse Response Filter, FIR filter 5 for short, as the essential component of an echo canceller, having an output signal h(k) that is subtracted from an echo-affected scanning value (in a time-sequence of scanning values) of a microphone signal z(k), for providing a scanning value of a compensated microphone signal y(k). In order to simulate or match the echo as identically as possible to the output signal of the FIR filter 5, a scanning value of a loudspeaker signal x(k) is fed to the FIR filter through a time-delay circuit 6.6, thus taking the signal propagation time from loudspeaker 1 to microphone 2 into consideration. FIG. 3 furthermore illustrates a filter 6 for determining a quality criterion Q.

The room echoes around microphone 2 are described by a number N of the filter coefficients $c_1$ to $c_N$ of FIR filter 5, the scanning frequency $f_s$ and the shortest distance $d_{ak}$ between loudspeaker 1 and microphone 2. A minimum acoustic signal propagation time $t_{ak}$ between loudspeaker 1 and microphone 2 corresponds to the distance $d_{ak}$, within which no echoes can take place, so that the pulse response of the loudspeaker 1→microphone 2 system during the interval $0 \leq t < t_{ak}$ has a value of zero. The effect of the FIR filter 5 is time-restricted by the ratio of the number N of filter coefficients and the scanning frequency $f_s$, $$t_{max} = N/f_s$$

so that echoes are detected within a time window $t_{ak} < t < t_{max}$, e.g., if N=132, and $f_s$=32 kHz, then $t_{max}$=4,125 ms.

The filter coefficients $c_1$ to $c_N$ are calculated according to the NLMS algorithm $$c_j(k+1) = c_j(k) + \alpha \left( \frac{y(k)\,x(k-j)}{\sum_{i=0}^{N-1} x^2(k-i)} \right) \quad \text{(Eq. 1)}$$

with j=1 ... $j_{ak}$ ... N and $j_{ak} = t_{ak} \cdot f_s$, where $c_1 \ldots c_{ak}$=0. In equation 1:

| | |
|---|---|
| k | continuous index of time-sequence scanning values |
| $c_j(k+1)$ | filter coefficient no. j at time (k+1) to be calculated anew |
| $c_j(k)$ | filter coefficient no. j at time k |
| $\alpha$ | step width |
| $y(k) = z(k)-h(k)$ | scanning value of microphone signal z(k) less output signal h(k) of FIR filter 5 at time k |
| $x(k-j)$ | scanning value of the loudspeaker signal at time (k-j) |
| $x(k-i)$ | scanning value of the loudspeaker signal at time (k-i) |
| N | number of filter coefficients |
| $j_{ak}$ | basic delay corresponding to $t_{ak}$ |
| j | index of time shift; continuous index of coefficients $c_j$ |
| i | index of time shift by the amount of time $t_{ak}$. |

The step width $\alpha$ is a measure of the change of filter coefficients $c_1$ to $c_N$ after a new calculation. $\alpha$ must be >0 so that a coefficient adaptation of the echo signal can even be obtained, furthermore $\alpha$ must be <2 to prevent instability and overcompensation. Overcompensation means coupling the output signal of FIR filter 5 to the microphone signal instead of a desired negative feedback; the echoes would be amplified. If the step width $\alpha$ is chosen to be large, although filter coefficients $c_1$ to $c_N$ change very quickly, there is still the danger of overcompensation. The danger of an improper adjustment is less with a small step width $\alpha$, but a longer time passes until the filter coefficients $c_1$ to $c_N$ adapt to a change in the room echo.

A miscalculation of the filter coefficients $c_1$ to $c_N$ takes place a) during duplex communication, i.e. both callers speak at the same time and b) during speech pauses, since the adaptation then goes to the amplifier noise. In such cases the FIR filter would be so badly adjusted, that the echo canceller would degrade the anti-sidetone induction from loudspeaker 1 to microphone 2.

According to the invention, the filter coefficients $c_1$ to $c_N$ change quickly with changes in the pulse response, meaning for example with changes in the loudspeaker 1 or microphone 2 position, or under seriously changed ambient conditions; they change slower with a well adjusted echo canceller or with doubtful measurements. This is accomplished by controlling the step width $\alpha$ a) as a function of the remaining loudspeaker-microphone coupling dlm after the echo canceller, b) by the quality criterion Q of the excitation, c) by the existence of local speech signals lokspk, d) by the existence of briefly fluctuating local noise lnoise, and e) by the recognition of an overcompensation loss.

This results in the following:

$$\alpha = f(dlm, lokspk, lnoise, loss) \quad (Eq. 2)$$

With such an adaptive step width $\alpha$, it is possible to use the echo canceller under different ambient conditions and with essentially different geometric arrangements of loudspeaker 1 and microphone 2. Echo cancellation can thus be used with both critical arrangements and narrow band telephones, as well as in conference studios.

Figure 4:
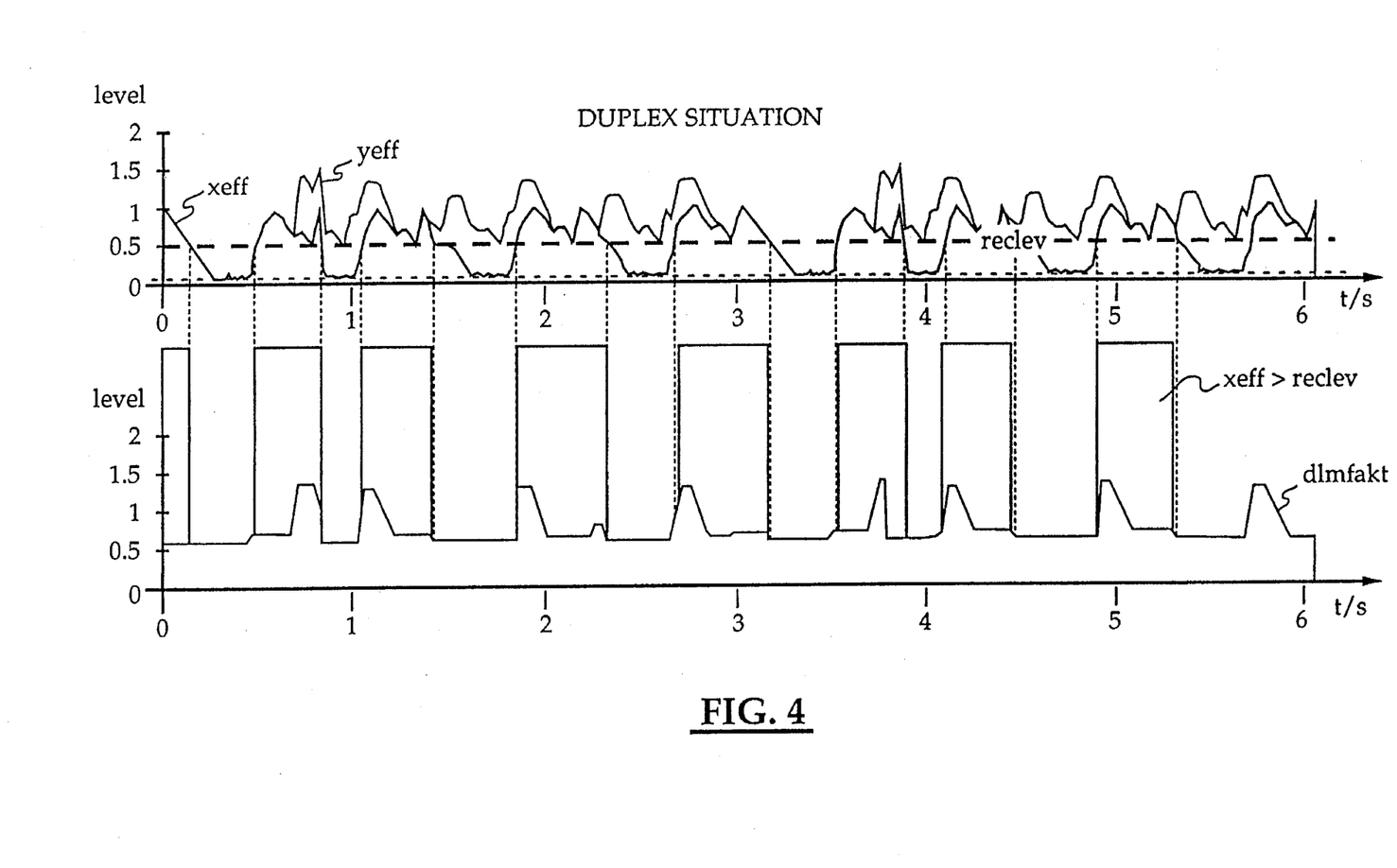
FIG. 4 is a time chart to illustrate a duplex situation.

The determination of the loudspeaker-microphone coupling dlm and the dependence of the step width $\alpha$ on the loudspeaker-microphone coupling dlm will now be described with the help of FIGS. 4 and 5.

To make possible a judgment of the momentary gain the echo canceller has attained, it is essential that an estimate of the loudspeaker-microphone coupling dlm takes place downstream of the echo canceller. For that reason we refer more accurately to the estimate of a residual coupling downstream of the echo canceller within a reception path to an emission path.

Figure 5:
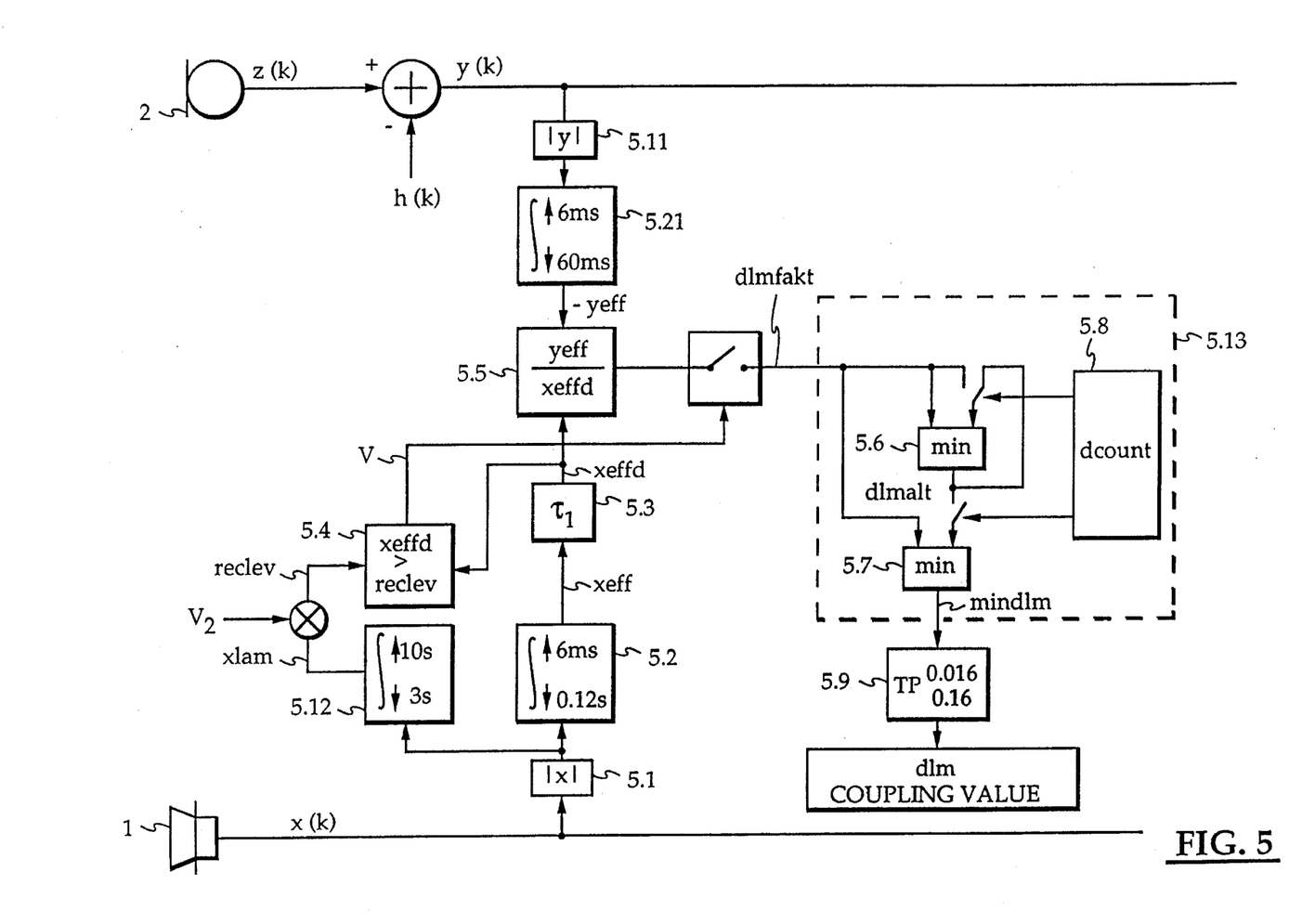
FIG. 5 is a circuit arrangement for estimating the residual coupling downstream of the echo canceller.

For example, according to FIG. 5, first the short-term level of the microphone signal yeff is determined from the time signal y(k) at the microphone 2 downstream of the echo canceller, by taking the absolute value at 5.11 and then integrating 5.21. In the same manner, the short-term level of the loudspeaker signal xeff is determined from the time signal x(k) at loudspeaker 1, by taking the absolute value at 5.1 and subsequently integrating 5.2. Accordingly, the long-term average value xlam of a scaled receiving level reclev is determined from the time signal x(k) at loudspeaker 1 by taking the absolute value at 5.1, integrating 5.12 and multiplying by a scale factor V2. To obtain the correct assignment in time of the short-term level of microphone signal yeff to the short-term level of loudspeaker signal xeff, the short-term level of loudspeaker signal xeff must be delayed at least by the acoustic signal propagation time $t_{ak}$, to balance the time delays of the path from loudspeaker 1 to microphone 2, as well as the delays of the transducers. The short-term level of loudspeaker signal xeff is delayed by a time-delay circuit 5.3 and delivers the delayed signal xeffd. Now, according to $$\frac{yeff}{xeffd} = dlmfakt \quad (Eq. 3)$$

a quotient is formed from the thus obtained signals with a divider 5.5, which delivers a coupling signal dlmfakt. This coupling signal dlmfakt is affected by errors particularly from local sounds, such as for example duplex communication, and in this form is not yet a suitable measurement of the loudspeaker-microphone coupling dlm. The lower part of FIG. 4 depicts the course in time of the coupling signal dlmfakt in a duplex communication situation. At first, only coupling signals dlmfakt are further evaluated, in which the signal xeffd, the delayed short-term average magnitude of the loudspeaker signal x(k) is greater than reclev, i.e., the long-term average value of a signal xlam, the longterm average magnitude of x(k), multiplied by a factor V2. In cases without duplex communication, the division according to equation 3 always produces lower values than with duplex communication. However, duplex communication is time-restricted, because the local speaker as well as the remote speaker insert word and sentence pauses during speech.

A very high probability of a correct measurement is given if only the smallest values resulting from the division within a time interval, for example 5s, are used to determine the loudspeaker-microphone coupling dlm. To determine the smallest value of the coupling signal dlmfakt, the signal dlmfakt is supplied to a first minimum value detector 5.13. The first minimum value detector 5.13 comprises a first storage and comparison circuit 5.6, and a second storage and comparison circuit 5.7 located downstream of the first, as well as a counter 5.8.

During a time interval determined by the counter 5.8, the output signal dlmalt of the first storage and comparison circuit 5.6 is constantly renewed to the lower value of dlmalt and dlmfakt, and thus seeks out the smallest value in the time interval. When counter 5.8 is reset, this value dlmalt is picked up by the second storage and comparison circuit 5.7, while the output signal dlmalt of the first storage and comparison circuit 5.6 is adjusted to the current coupling signal dlmfakt, in order to once again seek out the lowest value in the following time interval. The second storage and comparison circuit 5.7 compares the momentary value of the coupling signal dlmfakt with the stored output signal dlmalt of the first storage and comparison circuit 5.6. The second storage and comparison circuit 5.7 always picks up the smaller value, in order to find the smallest possible value mindlm. The output signal mindlm of the second storage and comparison circuit 5.7 is filtered by a low pass filter 5.9 and then delivers the best estimate of the loudspeaker-microphone coupling dlm. Possible errors in estimating this value are reduced by the formation of the time-average value by integrators 5.2 and 5.21 and by the filtering with low pass filter 5.9, as well as by the evaluation of the smallest coupling signal dlmfakt.

If the delay $\tau_1$ of the short-term level of loudspeaker signal xeff is precisely adjusted by the time-delay circuit 5.3, the low pass filtering can take place at a considerably higher cut-off frequency, thereby achieving a faster adaptation of the estimated value to the current loudspeaker-microphone coupling dlm.

As a function of the estimated loudspeaker-microphone coupling dlm, the step width $\alpha$ contained in Eq. 1 is adjusted according to the following function:

$$\alpha = f(dlm, Q, lokspk, lnoise, loss) \quad \text{(Eq. 4)}$$
$$= k_1 |dlm - \epsilon_1|^p \cdot g_1(Q, lokspk, lnoise, loss)$$

where:

dlm is the estimated current loudspeaker-microphone coupling $k_1$ is a constant $\epsilon_1$ is the operating point adjustment p is the exponent of the function.

It is furthermore possible to make the adjusting speed and the adjusting accuracy of the filter coefficients $c_1$ to $c_N$ a function of a quality criterion Q.

To reduce improper adjustments of the echo canceller to a minimum, the filter coefficients $c_1$ to $c_N$ of the FIR filter 5 (see FIG. 3) are only renewed when a minimum quality exists with respect to the incoming signal, namely the excitation of the loudspeaker, for example if the short-term level xeff of incoming signal x(k) exceeds a certain long-term average magnitude xlam of |x(k)| as determined in a block 5.4. The coupling value dlm is only determined if xeffd is greater than reclev, i.e., if the far-end speaker is talking. As the speech level changes in the short-term, it is different from the noise level which is more uniform. This makes it possible to distinguish between speech and noise. Only when speech is received is the (delayed) short-term magnitude of x(k) greater than the long-term average magnitude of x(k), and then the coupling value dlm is determined. When only noise is received, xeffd will be less than reclev, and the coupling value dlm is not determined. The sign of the difference (xeffd-xlam)=V determines whether the filter coefficients $c_1$ to $c_N$ can be renewed when V>0, or if the filter coefficients $c_1$ to $c_N$ maintain their value when V<0. In that case Q=½ (1+sign v). It is also absolutely possible to define other functions for the quality criterion Q, where the latter can have advantageous values between 0 and 1. For example, Q could signify the strength and the signal form of the excitation, as illustrated in FIG. 3, then Q=f(xeffd). The following function results for $\alpha$:

$$\alpha = k_1(dlm - \epsilon_1)^p \cdot Q^m \cdot g_2(lokspk, lnoise, loss) \quad \text{(Eq. 5)}$$
$$= k_1(dlm - \epsilon_1)^p \cdot [1/2 (1 + \text{sign } V]^m \cdot g_2(lokspk, lnoise, loss)$$

with m=1.

FIG. 3 depicts a filter 6 for determining the quality criterion Q. The filter can also be used for more complex evaluative functions of Q, for example the scanning values of the loudspeaker signal x(k) can be constantly monitored for a strong broad-band signal that is present in noise or pulse form, which is suitable for a quick and accurate determination of the filter coefficients $c_1$ to $c_N$. A strong excitation, for example clapping hands on one side of the caller, and silence on the other side, would thus be particularly suitable to quickly induce a desired setting of the echo canceller.

In case the local speaker is active, the step width $\alpha$ can only assume very small values to prevent an improper adjustment of the echo canceller. On the other hand $\alpha$ may not be zero, so that a change in the local acoustic situation can still be detected by the echo canceller, in spite of any duplex operation.

There are several possibilities for recognizing when the local speaker is speaking. For example, the above-mentioned U.S. patent application Ser. No. 08/197,054 proposes performing a correlation between the microphone signal z(k) and the delayed time signal x(k−τ) in loudspeaker 1, in order to deduce an active local speaker from low correlation values.

To estimate whether the local speaker is active, it is also possible to compare the short-term level of microphone signal yeff with the short-term level of incoming signal xeff, weighted with the coupling factor dlm. With a value of one, a control signal lokspk obtained in this manner indicates that there is local speech, and with a value of zero that there is no local speech.

The step width $\alpha$ can now be calculated as follows:

$$\alpha = k_1 |dlm - \epsilon_1|^p \cdot Q^m \cdot |1 - lokspk + \epsilon_2| \cdot g_3 \text{ (lnoise, loss)} \quad \text{(Eq. 6)}$$

Figure 6:
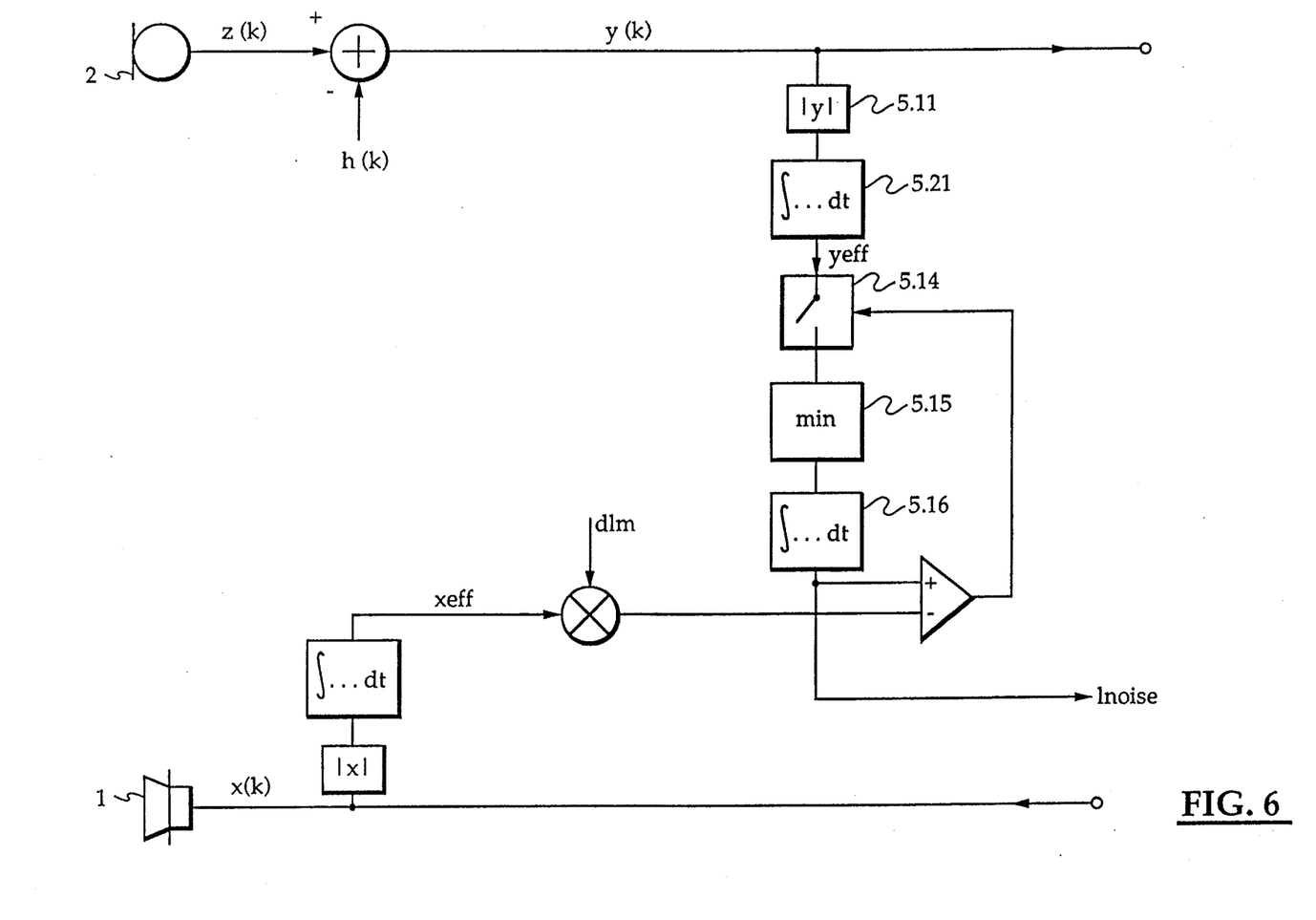
FIG. 6 is a circuit arrangement of a noise level estimator.

In addition, the step width $\alpha$ is adapted to the local noise situation. To that end, as shown in FIG. 6, the local noise is first determined with a local noise level estimator. From the compensated microphone signal y(k), the short-term level of microphone signal yeff is first determined with an absolute value block 5.11 and an integrator 5.21. This level signal is supplied through a switch 5.14 to a second minimum value detector 5.15, which operates in principle like the already described first minimum value detector 5.13. Through an integrator 5.16, an output signal of the second minimum value detector 5.15 provides the estimated value of noise level lnoise. Through switch 5.14, the signal portions of the short-term level of microphone signal yeff are removed from further processing, because they can feign a local noise with an incoming signal from the remote speaker. To that end, the just estimated noise level is compared in a comparator, as shown, with the short-term level of loudspeaker signal xeff, weighted with the coupling factor dlm. If the noise level is greater, switch 5.14 remains closed.

If the local playback volume in a hands-free speaking system is adjusted as a function of a local noise measurement, the signal-to-noise ratio of the local echo does not deteriorate by the full amount of the noise increase, but by a lower amount. The effect of the background noise on the control of step width $\alpha$ can then be correspondingly small. With respect to the step width $\alpha$, a low noise level minnoise can barely have any effect on the step width $\alpha$, while the latter becomes constantly smaller with increasing noise. The following then occurs:

$$\alpha = k_1 |dlm - \epsilon_1|^p \cdot Q^m |1 - lokspk + \epsilon_2| \cdot (minnoise/lnoise)^r + g_4 \text{ (loss)} \quad \text{(Eq. 7)}$$

In practical cases it is possible for the acoustic environment to change quickly with a well balanced echo canceller. The step width $\alpha$ is then very small and the echo canceller requires a long time to reset itself. A device which can determine the short-term gain or loss obtained by the echo canceller is provided to prevent this disadvantage. The result of this gain/loss estimate can then influence the step width α to advantage.

Figure 7:
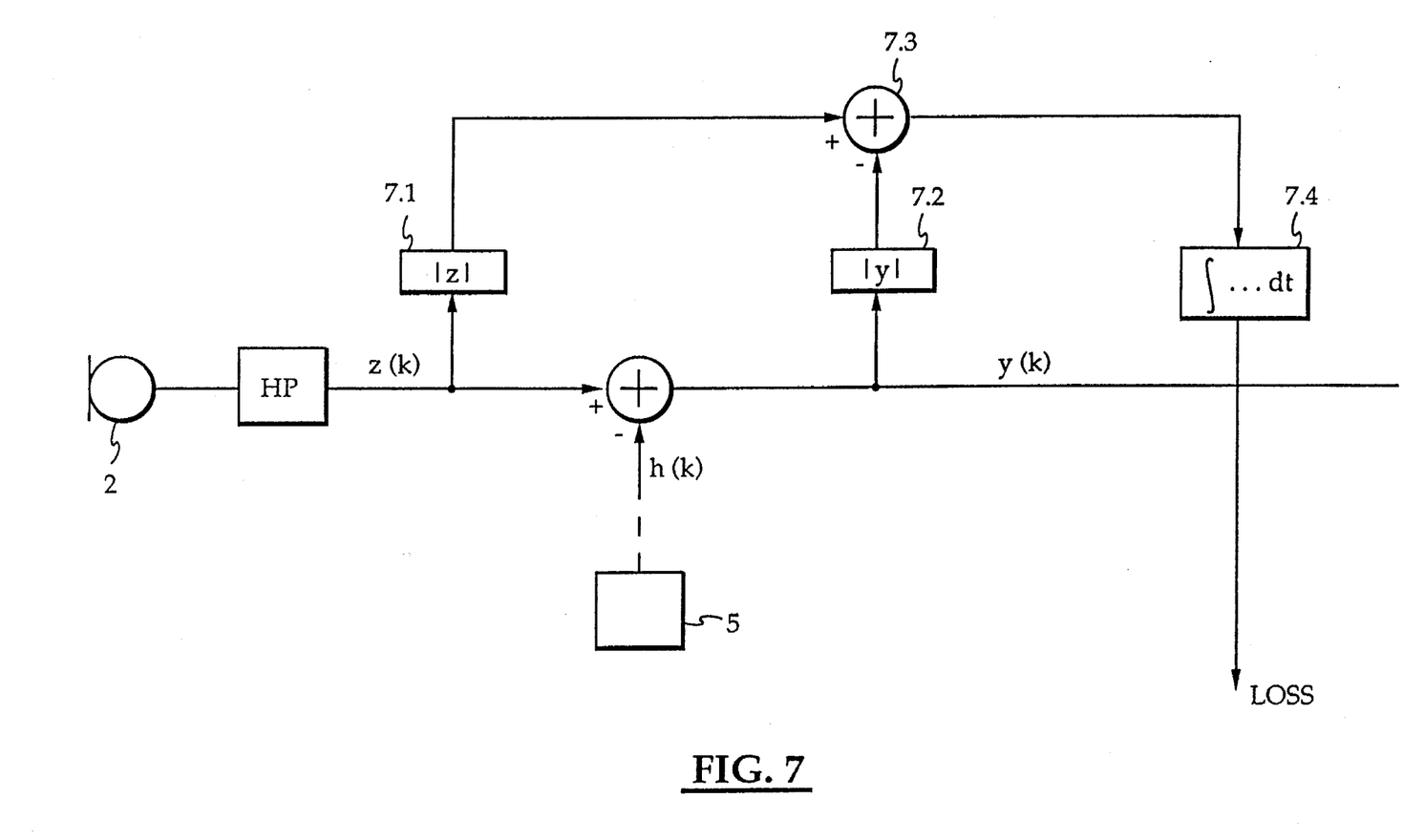
FIG. 7 is a circuit arrangement of a gain and loss estimator.

FIG. 7 depicts the block circuit diagram of a gain/loss estimator. The microphone signal z(k) is routed via a first absolute value block 7.1, and the compensated microphone signal y(k) via a second absolute value block 7.2, to a subtracter 7.3, whose output signal delivers the desired gain/loss indication with the signal loss through an integrator 7.4. The echo canceller contributes to a gain as long as the signal loss is positive. When the signal becomes negative it is an indication of overcompensation caused by the echo canceller.

In the following, the control of the step width α is explained in regard to the possibilities of utilizing this information to control the echo canceller.

When the signal loss is negative, thereby indicating a change in the acoustic environment, the step width α should be as large as possible, to enable a quick adaptation to the new situation. In that case, the parameters of loudspeaker-microphone coupling dlm, local active/inactive speaker lokspk and local existing/missing noise lnoise have less of an effect, resulting in the following equation for the step width α:

$$\alpha = k_1 |dlm - \epsilon_1|^p \cdot Q^m \cdot |1 - lokspk + \epsilon_2| \cdot minnoise/lnoise)^r + k_2 (1 - sign(loss)) \cdot Q^m \quad \text{(Eq. 8)}$$

The value of the loudspeaker-microphone coupling dlm can immediately be updated when the signal becomes negative.

The sensitivity of step width α is determined with the basic parameters by selecting the exponents p, m, r. If numbers smaller than one are chosen for p, m, r, the effect of the pertinent parameter on the step width α is greatly reduced. The above described echo canceller can be combined to advantage with a compander, which is described in the above-referenced U.S. patent application Ser. No. 08/197,054 for the purpose of an adaptive hands-free speaking system, and in addition in Walker, M.: Hands-Free Operation, A Step Towards Natural Telecommunication, Electrical Communications, 1993, 2nd. quarter, pages 181–187.

Figure 8A:
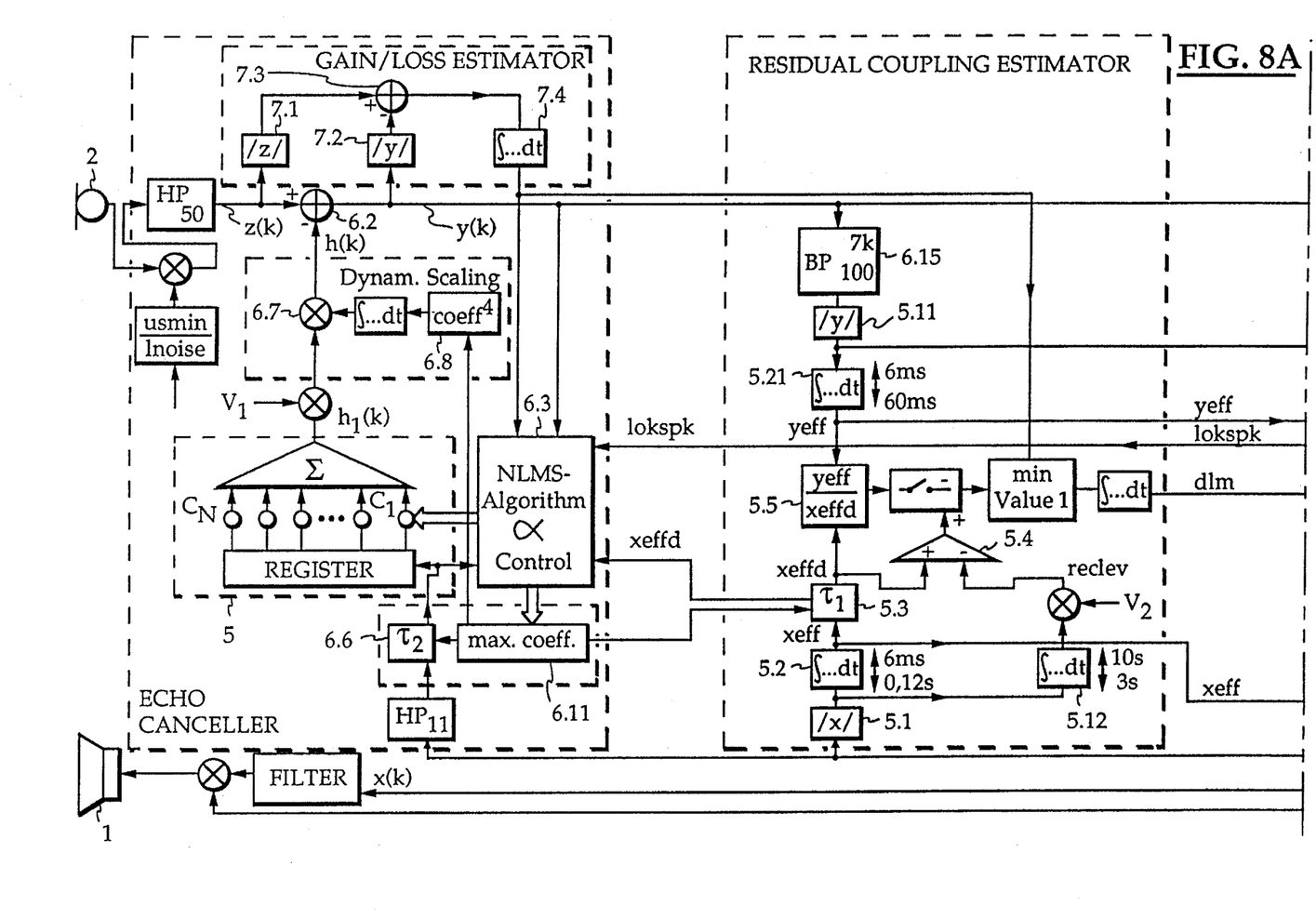
Figure 8B:
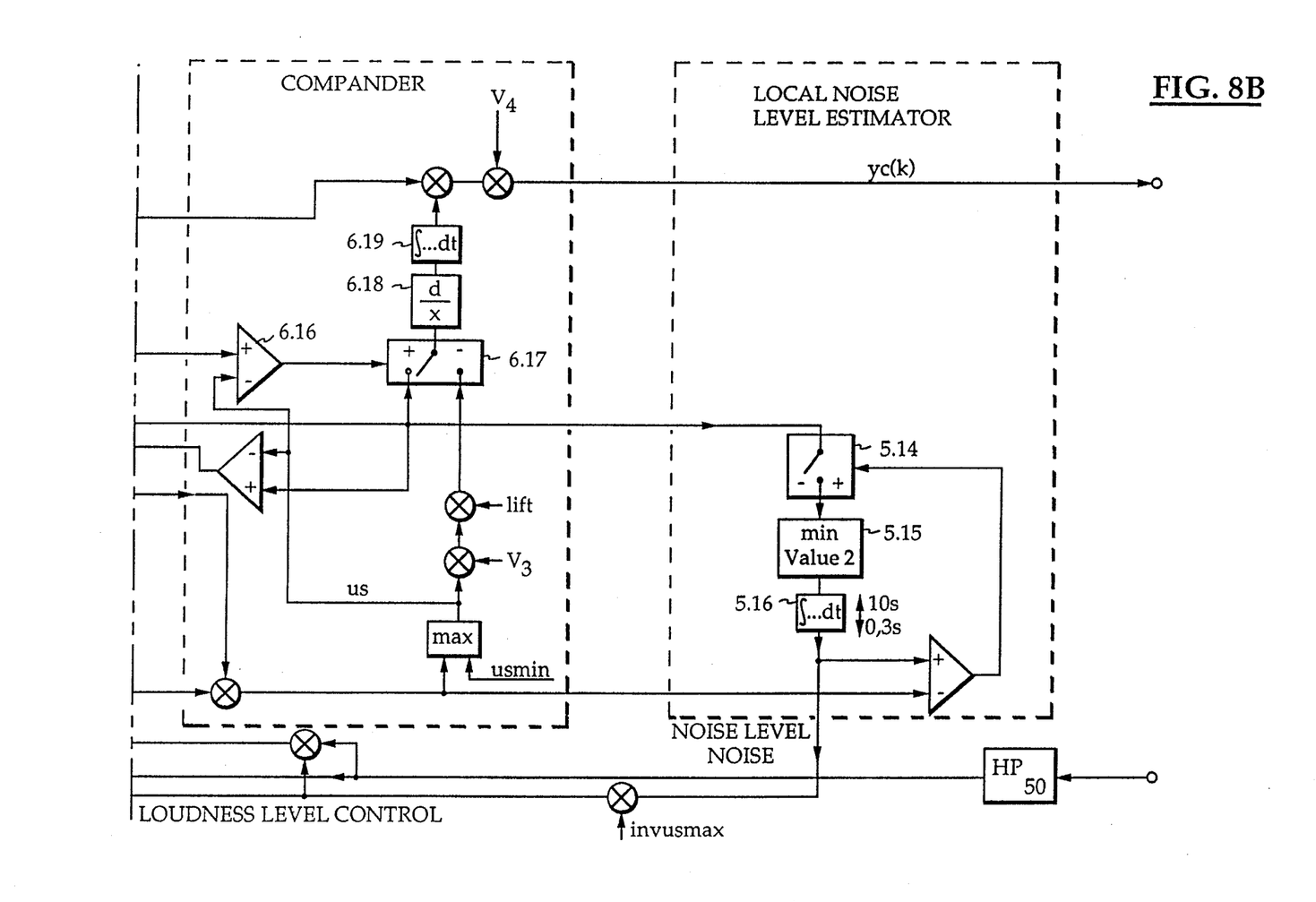

FIG. 8 shows how FIGS. 8A and 8B fit together to depict a block circuit diagram that comprehensively describes the hands-free operation. According to their function, the individual blocks are named echo canceller, estimator of the residual coupling behind the echo canceller, as already illustrated separately in FIG. 5 and described earlier, compander, local noise level estimator and filter to flatten the loudspeaker frequency response. The echo canceller essentially comprises the FIR filter 5, whereby the echo signal h(k) is simulated from the incoming signal x(k) and subtracted from the microphone signal z(k) by a subtracting circuit 6.2. The filter coefficients $c_1$ to $c_N$ of FIR filter 5 are calculated in the adaptation block 6.3. The variable step width α achieves that the adjustment of filter coefficients $c_1$ to $c_N$ takes place quickly and without errors in most cases. The control of step width α comes about as described earlier.

The FIR filter 5 is preceded by a variable time-delay line 6.6, which bypasses the time required by the sound to go from loudspeaker 1 to the microphone 2, to limit the filter length N of FIR filter 5 to the actual echoes.

To optimize the calculated accuracy of the filter coefficients $c_1$ to $c_N$, the output signal $h_1(k)$ of FIR filter 5 is first amplified with a constant factor $v_1$, and then multiplied in a 32-bit wide accumulator 6.7 with the time-integrated n-ten power of the largest occurring filter coefficient. In the cost-effective fixed-point computer being used, the filter coefficients are only stored in a 16-bit solution. The multiplication with the time-integrated n-ten power of the largest coefficient value, for example n=4, achieves that the coefficients of the FIR filter are optimally and dynamically scaled (zoomed) in real-time, so that for the first time essentially the same gain can be advantageously achieved with a fixed point computer as with a much more expensive floating point computer. This makes it possible to use the echo canceller both in telephone sets with an anti-sidetone induction between loudspeaker and microphone of −28 dB for example, as well as in studios with an anti-sidetone induction of 8 dB, for example.

The delay time $\tau_2$ to be established in time-delay circuit 6.6 can be determined from the position of the largest coefficient in the register (index).

The characteristic curve of the compander is adjusted in the compander block of FIG. 8B. Insofar as they stay above a reference value, the signals delivered by the microphone 2 are compressed to a uniform signal level by the compander. They remain unchanged as long as they stay at the reference value, and their level is further lowered if they fall under the reference value. To evaluate the microphone level, disturbing low and high frequency noises such as footfall and rumble noises are removed from the compensated microphone signal y(k) by a band-pass filter 6.15, thus filtering out the frequency range that can be perceived by the human ear. After taking the absolute value at 5.11, the effective value yeff is formed by the integrator 5.21 from the compensated microphone signal y(k). The time constants are adapted to the response of the human ear.

In the compression range, the amplification value must be lowered proportionally with increasing input level, and superproportionally with decreasing input level in the expansion range. The transition between the ranges is controlled by a comparator 6.16, which compares a threshold signal us with the amplitude of the compensated microphone signal |y(k)|. In that case, the threshold signal us is the maximum of the estimated noise level lnoise or the short-term level of loudspeaker signal xeff, weighted by the coupling factor dlm.

To calculate the gain factor, a switch 6.17 switches between the compression and expansion ranges. If the amount of the compensated microphone signal |y(k)| exceeds the threshold value us, which is determined by the comparator 6.16, the division must be performed by the circuit block 6.18 with the effective value of loudspeaker signal xeff. With small input signals, which just exceed the threshold value us, the amount of the compensated microphone signal |y(k)| only reaches the threshold briefly during a period, in contrast to large signals |y(k)|, where only the zero passages lie under the threshold. The subsequent integration in integrator 6.19 averages the result of the division. This results in a softer transition between the compression and expansion ranges, and thereby a desired residual dynamic of about 10 dB.

Since the numeric range of the fixed-point processor is limited to less than one, the result of the division may never be greater than one. A normalization magnitude a is used, as shown in the divider 6.18, which fulfills this requirement for the largest occurring gain. 1/1024 is chosen for a.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of providing adaptive echo cancellation in a transmission system comprising an echo canceller with a finite impulse response (FIR) filter (5), with which expected echoes are simulated and having an output signal for subtraction from a useful signal affected by echo, the FIR filter coefficients ($c_1 \ldots c_N$) having values determined by a normalized least mean square (NLMS) algorithm characterized in that a step width ($\alpha$) introduced in the NLMS algorithm is controlled in dependence upon ambient conditions of a signal source (1) and a signal sink (2) at a near end of the transmission system, upon disturbance variables superimposed on the useful signal, and upon efficiency of the echo canceller, that from the value of a greatest filter coefficient ($c_{max}$) of the FIR filter (5), a normalization quantity is determined for the FIR filter and, thus, for all the filter coefficients ($c_1 \ldots c_N$) of the FIR filter (5) such that the values of the filter coefficients ($c_1 \ldots c_N$) are automatically dynamically scaled and that said values lie within a range of defined limits, and that from a time interval between the greatest filter coefficient ($c_{max}$) of the FIR filter (5) and a beginning of an excitation of a signal in a transmit direction, a shortest signal propagation time ($t_{ak}$) from the signal source (1) to the signal sink (2) is determined, an effective time range of the echo canceller is determined therefrom, and this effective time range is used to estimate a value (dlm) for a residual coupling signal.

2. A method as claimed in claim 1, characterized in that the step width ($\alpha$) is determined in dependence upon a current residual coupling signal value (dlm) remaining after the echo canceller between signal source (1) and signal sink (2) such that the step width ($\alpha$) increases with the increasing coupling value (dlm).

3. A method as claimed in claim 2, characterized in that the current residual coupling signal value (dlm) is determined with a first minimum value detector (5.13) in which a first memory and comparator circuit (5.6) determines a smallest residual coupling signal value (dlmalt) in a time interval fixed by a counter (5.8) and passes said smallest residual coupling signal value to a second memory and comparator circuit (5.7) which compares an instantaneous value of the residual coupling signal (dlmfakt) with the smallest residual signal coupling value (dlmalt) from the first memory and comparator circuit (5.6) to provide an absolutely minimal residual coupling signal value (mindlm).

4. A method as claimed in claim 1, characterized in that the step width ($\alpha$) is controlled in accordance with a quality measure (Q) which is determined from a difference signal between a short-term level of a signal (x(k)) provided to the signal source (1) and a defined nominal value signal (reclev), and that in the event of a positive sign of the difference signal, the step width ($\alpha$) becomes positive and the filter coefficients ($c_1 \ldots c_N$) are renewed, while in the event of a negative sign of the difference, the quality measure (Q) and the step width ($\alpha$) become zero and the filter coefficients ($c_1 \ldots c_N$) thus retain their values.

5. A method as claimed in claim 1, characterized in that the step width ($\alpha$) is controlled in response to changes in a local signal superimposed on the signal of the signal sink (2) at a local end of the transmission system, in response to changes in an acoustic signal of a local speaker, by comparing the short-term level of the signal (z(k)) of the signal sink (2) with the short-term level of the signal (x(k)) of the signal source (1) and determining from a result of the step of comparing whether an additional local signal source is active or not, and that the step width ($\alpha$) is reduced with increasing level of local signal source (lokspk).

6. A method as claimed in claim 1, characterized in that the step width ($\alpha$) is controlled in response to changes in background noise of a room containing the signal source (1) and the signal sink (2), such that at a low noise level (minnoise), the step width ($\alpha$) remains unchanged, and that with increasing noise level (lnoise), the step width ($\alpha$) steadily decreases.

7. A method as claimed in claim 1, characterized in that the step width ($\alpha$) is dependent on a controlled variable formed from a difference between an echo-affected short-term level of a signal (z(k)) of the signal sink (2) and the short-term level of the echo-compensated signal (y(k)) of the signal sink (2), that a positive sign of the difference indicates that the echo canceller is providing a gain and the step width ($\alpha$) is thus retained, that a negative sign of the difference indicates that the echo canceller is producing a loss, and that the step width ($\alpha$) is then increased independently of further influencing variables.

8. A method as claimed in claim 1, characterized in that the signal source is a loudspeaker (1), and the signal sink a microphone (2), and that the echo canceller forms part of a hands-free facility of a telecommunications terminal.

9. A method as claimed in claim 1, characterized in that the control of the step width ($\alpha$) and the dynamic scaling of the filter coefficients ($c_1 \ldots c_N$) permit an implementation of the method with a FIR filter (5) of short length (N) and with a fixed-point computer.

* * * * *

UNITED STATES PATENT AND TRADEMARK OFFICE
CERTIFICATE OF CORRECTION

PATENT NO.   : 5,570,423
DATED        : October 29, 1996
INVENTOR(S)  : Walker et al It is certified that error appears in the above-indentified patent and that said Letters Patent is hereby corrected as shown below:

At column 1, lines 27-28, please cancel "H änsler" and substitute --Hänsler-- therefor.

At column 7, line 53, please cancel "(1+sign v)" and substitute --(1+sign V)-- therefor.

At column 9, line 26, please insert --(-- prior to "minnoise/lnoise)" in Eq. 8.

Signed and Sealed this

Fifteenth Day of April, 1997

Attest:

BRUCE LEHMAN

*Attesting Officer*      *Commissioner of Patents and Trademarks*